Sept. 20, 1960  H. C. ROTERS  2,953,700

HYSTERESIS MOTOR ROTOR

Filed May 15, 1958  3 Sheets-Sheet 1

Sept. 20, 1960  H. C. ROTERS  2,953,700
HYSTERESIS MOTOR ROTOR
Filed May 15, 1958  3 Sheets-Sheet 2

United States Patent Office 2,953,700
Patented Sept. 20, 1960

2,953,700

HYSTERESIS MOTOR ROTOR

Herbert C. Roters, Kew Gardens, N.Y., assignor to Casner Patents, Inc., a corporation of New York Filed May 15, 1958, Ser. No. 735,573

12 Claims. (Cl. 310—261)

This invention relates to hysteresis motor rotors and, while it is of general application, it is particularly advantageous as embodied in a gyro-spin motor and will be described specifically in such an embodiment.

Two of the most important characteristics of a gyro-spin motor are high mechanical stability and high electrical efficiency. The first characteristic is generally achieved by the use of motors of the hysteresis type including a simple cylindrical, usually annular, solid rotor of magnetic material having a high hysteretic constant. Such a structure obviously is mechanically more stable than other forms of composite motor rotors, such as the induction rotor having a cast cage and a laminated core.

The requirement of high electrical efficiency is not based primarily on the desire of conservation of power, but rather to minimize the heating of the stator in order to minimize shifts in the center of gravity due to unequal temperature coefficients of expansion of the stator materials. This is the reason also why mechanical stability of the rotor is important. Recent developments in the hysteresis motor field, for example as represented in applicant's prior Patent No. 2,547,599, have made possible the construction of hysteresis motors having electrical efficiencies comparable or exceeding those of induction motors of similar power rating.

In gyro-spin motors, a high starting torque per volt-ampere of input is also highly desirable, since it not only minimizes the time required to reach operational speed, but it also lessens the temperature rise during the starting interval and reduces the current which must be carried by the delicate springs forming the electrical connection between the gyro gimbals and the motor. From this point of view also, the hysteresis rotor is generally preferred to a low-slip induction rotor as it draws less starting current for a given torque. However, the hysteresis rotors heretofore proposed have been subject to one limitation, that is, a relatively low stability at synchronism. By this is meant that the rotor is subject to long-period, small-amplitude variations in angular velocity about the true synchronous speed.

It is known in the art that the torque which a hysteresis rotor can hold in synchronism is usually less than the torque it can develop as a hysteresis motor when slipping a few per cent. below synchronism. It has also been recognized more recently that there is a considerable difference in the phenomenon of producing torque below synchronism and producing a lock-in torque at synchronism by means of a hysteresis rotor. The development of torque below synchronism is a pure hysteresis phenomenon and is directly related to the area of the hysteresis loop of the rotor material. The maximum load torque which a motor can start from rest and bring into synchronism, that is, the minimum torque output of the motor during the starting cycle, is sometimes referred to as the synchronizing torque and that term will be so used herein. On the other hand, the production of lock-in torque at synchronism is dependent on the maximum magnetic moment that can be developed between the stator and the magnetically polarized rotor without causing the magnetic pole in the rotor to slip. Other things being equal, this magnetic moment is directly related to the coercivity of the magnetic material of the rotor.

If synchronization of a hysteresis motor is effected by increasing its excitation slowly and uniformly and with a constant load torque, so as to bring its rotor into synchronism very slowly, there is no great difference in performance between motors having identical stators and otherwise identical "soft" and "hard" homogeneous rotors. In either case, it will be found that a slight decrease in voltage below the value producing synchronism will cause the rotor to drop out of synchronism. However, the "hard" rotor will require considerably more exciting volt-amperes to bring it into synchronism than the soft rotor. At synchronism both rotors will develop the same magnetic moment, but the "hard" rotor is potentially capable of developing a far greater magnetic moment than the "soft" one, this greater potentiality often being observable after the synchronization described above, if the load is momentarily removed, or if the rotor is allowed to come into synchronism with a high acceleration. In either event, the axis of polarization of the rotor assumes, momentarily, a different position with respect to the revolving field of the stator, resulting in a higher rotor magnetization. If such a "hard" rotor is now loaded to pull it out of synchronism, it will be found that, before pull-out, it will carry considerably more torque than it pulled into synchronism. Under similar conditions, the "soft" rotor will carry little, if any, more torque. Thus, on pull-out, the "hard" rotor generally drops out of synchronism suddenly (the rotor speed drops to a value well below synchronism and may even come to standstill) because the load at pull-out may greatly exceed that which it was capable of pulling into synchronism at the same voltage. However, the "soft" rotor will generally not exhibit any great tendency to increase its rotor magnetization after pull-in, with the result that the pull-out remains close to the valve of pull-in torque, even though the load may have momentarily decreased below the original pull-in point. These effects are relative and, in the example just cited, the "hard" rotor, which has much more potential hysteresis loop area energy and a much greater potential maximum value of coercive magnetic intensity, will be operating much farther away from its maximum capability than the "soft" rotor and so will be capable of receiving and retaining a much greater coercive magnetic intensity. The "hard" rotor will be operating at a lower flux density and a higher magnetic intensity as evidenced by the relatively high pull-in current, while the "soft" rotor will be operating at a relatively higher flux density and lower magnetic intensity, as evidenced by the relatively low pull-in current.

Thus, fundamentally, a so-called "soft" rotor is one which is operating near its maximum potential magnetic level and hence, under the condition of constant voltage, cannot receive and keep any coercive magnetic intensity greatly in excess of what it had at pull-in. The result is that, even for a small increase in voltage, the increment in pull-in torque is small, and likewise for a small decrease in voltage the decrement in pull-in torque is small. Under these conditions, the actual phenomenon of pull-in or pull-out is said to be soft; that is, it is somewhat indefinite, with no sharp transition from slightly sub-synchronous to synchronous operation, or the reverse.

For the two rotors described above, the "hard" rotor will require a much larger volt-ampere input to synchronize than the "soft" rotor. This large volt-ampere input for the "hard" rotor will be in the form of a smaller voltage and a larger current and for the "soft" rotor as a larger voltage and a smaller current. Thus, the "hard" rotor requires much higher stator-exciting magnetomotive force with higher rotor magnetic intensities for synchronization than the "soft" rotor. This apparent high volt-ampere efficiency for the "soft" rotor on synchronizing (low volt-amperes per unit torque or power output) obtains because it is operating at or near its optimum point compared to the "hard" rotor, the volt-ampere efficiency of which will increase as the synchronizing load torque is increased.

The ideal rotor would be one which synchronizes with a high volt-ampere efficiency and after synchronization resists pull-out up to a torque value well in excess of the pull-in value without the necessity of momentarily removing the load or momentarily increasing the applied voltage to induce a higher coercive magnetic intensity in the rotor steel. Such a rotor would simultaneously combine the desirable characteristics of both the "soft" and "hard" rotors, giving a relatively low volt-ampere input at starting and high stability against fluctuations or oscillations in speed due to load, voltage, or frequency changes after synchronization.

It is an object of the present invention, therefore, to provide a new and improved hysteresis motor rotor which overcomes the above-mentioned limitations on prior hysteresis motors and imparts to the motor one or more of the following desirable operating characteristics: high electrical efficiency, high mechanical stability, high electrical stability at synchronism, high synchronizing torque and high stall torque per volt-ampere input, reduced synchronizing power, pull-out torque substantially exceeding pull-in torque, and improved performance on over-voltage starting.

It is a further object of the invention to provide a new and improved hysteresis motor rotor which combines the superior starting characteristics of a "soft" magnetic material with the superior synchronizing and synchronous performance of a "hard" magnetic material.

It is a still further object of the invention to provide a new and improved method of heat-treating a hysteresis motor rotor of homogeneous alloy steel to produce a rotor having one or more of the desirable characteristics set forth above.

In accordance with the invention, there is provided in a hysteresis synchronous motor, a rotor construction comprising a cylindrical member of magnetic material of high hysteretic constant having an even number of spaced segmental first zones of a given coercivity and an equal number of segmental second zones alternating with the first zones and of a substantially greater coercivity.

Still further in accordance with the invention, there is provided a method of heat-treating a hysteresis motor rotor in the form of a cylindrical member of homogeneous alloy steel having a high hysteretic constant and a given coercivity which comprises locally heating an even number of spaced segmental zones to an elevated temperature and drawing the same at a temperature to impart thereto a coercivity substantially different than that of the intervening zones. The term "drawing" is used herein and in the appended claims in its usual sense to refer to a gradual reheating of the steel to a predetermined temperature to impart to it a desired temper.

For a better understanding of the present invention, together with other and further objects thereof, reference is had to the following description taken in connection with the accompanying drawings, while its scope will be pointed out in the appended claims.

Referring now to the drawings.

Figure 1:
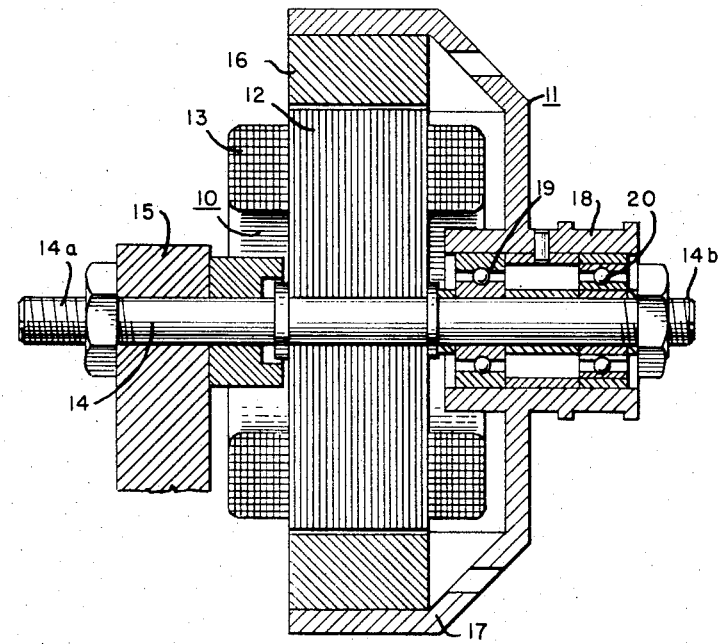
Fig. 1 is a longitudinal sectional view of a motor including the hysteresis rotor of the invention.
Figure 2:
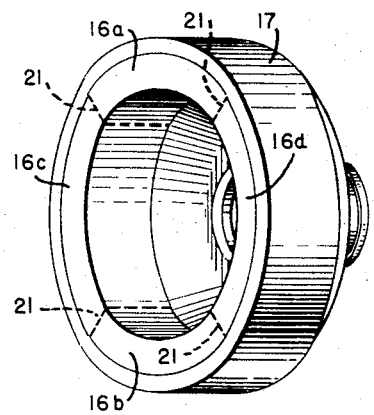
Fig. 2 is a perspective view of the rotor of the motor of Fig. 1.

Referring now to Figs. 1 and 2 of the drawings, there is represented a hysteresis synchronous motor including a rotor construction embodying the present invention. This motor comprises a co-operating stator 10 and an outside rotor 11. The stator 10 may be of conventional construction including a cylindrical laminated magnetic core member 12 and a polyphase distributed winding 13 which also may be of conventional winding arrangement and configuration. The outer ends of the slots of the core structure 12, in which the winding 13 is disposed, are closed either by integral bridges of the core laminations or by separate magnetic bridges, in accordance with the teaching of applicant's aforesaid Patent 2,547,599. The core structure 12 is mounted on a stationary shaft 14 threaded at either end 14a and 14b for suitable mounting as, for example, on a plate 15.

The rotor 11 of the motor of Fig. 1 comprises a cylindrical member, such as an annular ring 16, of magnetic material of high hysteretic constant, for example, a cobalt alloy steel containing cobalt of the order of 17%. The ring 16 is press-fitted in a cup-shaped member 17 of non-magnetic material, such as aluminum. The member 17 is provided with an elongated hub 18 mounted on the shaft 14 by means of spaced anti-friction bearings 19 and 20.

The ring 16 is formed to have an even number, for example, two pairs, of spaced segmental zones of substantially different coercivity. In case the ring 16 is an integral structure, these zones may be formed by the heat treatment described hereinafter. Alternatively, the ring may be formed of a plurality of discrete segments of material having substantially different coercivity. Thus the "zones" of the ring 16 refer equally to the regions of an integral structure or to the segments of a segmented structure. As shown in Fig. 2, the divisions between the four zones are indicated in dotted lines 21. For example, referring to Fig. 2, the ring 16 may be comprised of the zones 16a and 16b of a given relatively low coercivity, while the zones 16c and 16d alternating with the first zones have a substantially greater coercivity. In this arrangement, each of the zones extends over and comprises a 90° segment.

In case the ring 16 of Figs. 1 and 2 is an integral one with the zones formed by heat treatment described hereinafter, it will be seen that it comprises a cylindrical member of homogeneous alloy steel having a high hysteretic constant and a high coercivity and having an even number, for example, the pair of spaced segmental zones 16a, 16b, heat-treated to impart thereto a substantially lower coercivity, as by drawing these zones at a relatively high temperature, while the alternating zones 16c, 16d have the substantially higher coercivity of the original ring.

In the event that the ring 16 of Figs. 1 and 2 is formed of discrete segments, it will be seen that it comprises at least two pairs, that is, at least one pair per pole, of complementary cylindrical segments of magnetic material having a high hysteretic constant, alternate ones of the segments having a relatively low coercivity and intervening ones having a substantially greater coercivity.

Figure 3:
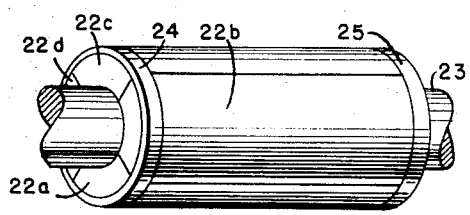
Fig. 3 is a perspective view of the invention as embodied in an inside rotor.

In Fig. 3 is represented a rotor construction embodying the invention for use in an inside-rotor motor. In this embodiment, the rotor comprises four 90° annular segments 22a, 22b, 22c, 22d disposed on a shaft 23 and retained at either end by collars 24 and 25 of non-magnetic stainless steel or other non-magnetic material of high tensile strength, preferably shrunk over the rotor segments in place. It will be apparent that the principles of operation of the rotor of Fig. 3 are in all respects similar to those of the rotor in Figs. 1 and 2 described hereinafter.

Figure 4:
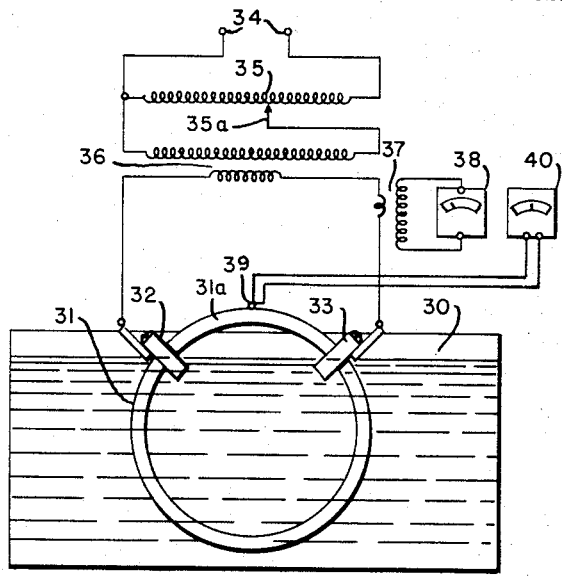
Fig. 4 is a schematic representation of an apparatus for heat-treating the rotor ring of Fig. 1; while Figs. 5-9, inclusive, comprise a series of curves representative of the performance characteristics of a typical motor such as illustrated in Figs. 1 and 2.

Before describing the principles of operation of the hysteresis rotor embodying the present invention, reference is made to Fig. 4 of the drawings which illustrates schematically apparatus for heat-treating an integral rotor ring, such as the ring 16 of Figs. 1 and 2. This apparatus comprises a tank 30 adapted to be nearly filled with a cooling fluid, such as water. The rotor ring 31 to be heat-treated is partially submerged in the fluid in the tank 30, leaving only a 90° segment 31a exposed above the water. At either end of this segment 31a is clamped an electrical clamp or connector 32, 33. These clamps preferably have arcuate contact surfaces closely fitting the inner and outer peripheries of the ring 31 to maintain as nearly perfect an electrical contact as possible and extend into the water to be cooled thereby. The electrical connectors 32 and 33 are supplied with a high-amplitude low-voltage alternating current from supply circuit terminals 34 through an autotransformer 35 having an adjustable tap 35a and a high-ratio step-down transformer 36. A current transformer 37 in series with the electrical circuit to the connectors 32, 33 is connected to a meter 38 for aid in controlling the amount of the heating current. A thermocouple 39 is attached to the surface of segments 31a and connected to a thermometer 40 for giving a continuous indication of the temperature of the heated segment 31a. The exposed segment 31a is preferably heat-insulated as by a covering of ceramic refractory cement which will withstand elevated temperatures while retaining its insulating properties, for example, that commercially available from Sauereisen Cement Company, Pittsburgh, Pennsylvania, as No. 78 cement under the trade name "Sauereisen."

With the electrical connections as shown in Fig. 4 of the drawings, the major portion of the alternating current from the source 34 will pass through the relatively short segment 31a of the rotor ring 31 and a minor portion will pass through the submerged segment in the water bath, due to the fact that this latter segment has three times the resistance of the segment 31a. In the treatment of a rotor ring having the specifications given hereinafter, the tap 35a of the auto-transformer was adjusted so that a current of the order of 1100 amperes was passed from clamp to clamp and the upper portion of the rotor was heated to a maximum temperature of approximately 1200° F., as indicated by the thermometer 40. The lower part of the rotor ring 31 was kept relatively cool by means of the water bath and the maximum temperature at the clamps, as determined by the thermocouple 39 and thermometer 40, was substantially 300° F. The water in the region of the clamps boiled and its bubbling action helped to maintain the clamps cool. The segment 31a was heated or drawn at 1200° F. for approximately thirty minutes. After this the rotor was reversed with a 90° segment diametrically opposed to the segment 31a projecting from the water bath and carrying the main current. This segment was given a heat treatment the same as that described above for segment 31a.

The heat treatment of the ring 31 just described is applicable to a relatively hard magnetic steel which has been previously drawn at a relatively low temperature and, hence, has a relatively high coercivity. In the event that the starting point is such a ring with no previous heat treatment, the ring should initially be heated to an elevated temperature of the order of 1740° F., quenched as recommended by the manufacturer to develop its optimum magnetic properties, and drawn at a relatively low temperature of the order of 200° F. to impart thereto a predetermined, preferably relatively high, coercivity.

Such a uniformly treated ring treated as described above in connection with Fig. 4 results in locally heating or drawing an even number of spaced segmental zones at an elevated temperature, for example, 1200° F. to impart thereto a coercivity substantially less than that of the intervening zones maintained in the water bath during the heat treatment described. Essentially this heat treatment comprises passing a controlled electric heating current through each of selected segments, while cooling the remainder of the ring.

In the fabrication of hysteresis rotor rings utilizing the heat treatment described above, the following specifications are suitable:

Alloy composition:
    Cobalt _____percent__ 18.5
    Chromium _____do____ 3.75
    Tungsten _____do____ 5.0
    Carbon _____do____ 0.75
    Iron _____ Balance Quenching temperature _____°F__ 1750

Drawing temperatures:
    Soft draw 500° F. to 1200° F.
    Hard draw 200° F. to 300° F.

Coercivity:
    Hard zones 320 to 250 ampere-turns/inch
    Soft zones 200 to 80 ampere-turns/inch While it will be apparent that the invention is suitable for embodiment in hysteresis motor rotors of a wide variety of sizes and specifications, there follow, by way of example, the principal specifications of one motor constructed in accordance with the invention.

Stator core 12:
    Outside diameter _____inches__ 1.5996
    Stack length _____inch__ 0.50
    Laminations ____inch__ 0.007—silicon steel sheets.

Winding 13:
    Two pole double-layer lap winding, 53 turns per coil, No. 32 heavy Formex wire wound ¾ pitch; four coils per phase group giving a total of six phase groups per pair of poles; opposite phase groups series-connected with eight series coils per phase; three phases Y-connected; resistance 53 ohms at 22° C. line to line; coil slots closed with silicon steel wedges approximately 0.007 inch thick ground to conform with the finished stator outside diameter.

Supply voltage _____cycles/sec__ 400
Synchronous speed _____r.p.m__ 24,000

Rotor ring 16:
    Cobalt alloy steel specified above (Simonds No. 81)
    Outside diameter _____inches__ 1.828
    Inner diameter _____do____ 1.614
    Length _____inch__ 0.55

The principles of operation and desirable performance characteristics of a hysteresis motor including a rotor embodying the present invention will be explained with reference to the curves of Figs. 5–9, inclusive. These curves represent measured performance characteristics of three motors: (1) a motor having the specifications given above; (2) a motor including the identical stator and a rotor having the same dimensions as the foregoing but uniformly "hard" drawn at 200° F.; and (3) a motor also including the identical stator and a rotor of the same dimensions as the foregoing but uniformly "soft" drawn at 1000° F. In each of Figs. 5–9, inclusive, each curve is identified by a letter and a subscript, the subscript "1" referring to the motor with the variable-coercivity rotor embodying the invention; the subscript "2" referring to the motor with the rotor "hard" drawn at 200° F.; and subscript "3" to the motor with the rotor "soft" drawn at 1000° F.

Figure 5:
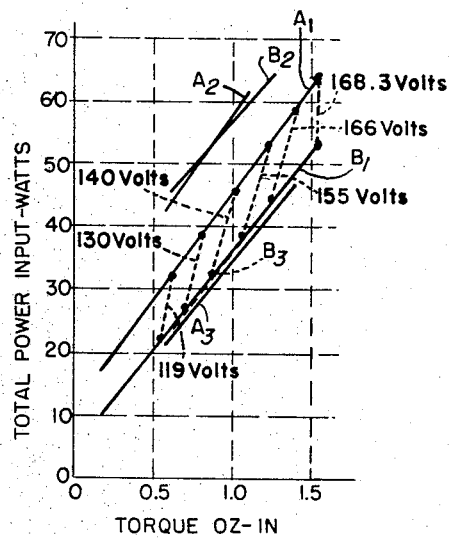

Referring now to Fig. 5 of the drawings, the curves $A_1$, $A_2$, and $A_3$ represent the torques which the three motors develop slightly below synchronism, while the curves $B_1$, $B_2$, and $B_3$ represent the pull-in torques of the motors, both sets of curves being plotted against total power input adjusted by adjusting the input voltage. The data for these curves of Fig. 5 was taken in the following manner:

A given voltage was applied to the motor and the load torque adjusted so as to allow the rotor to accelerate to slightly below synchronism. Then, with the voltage held constant, as indicated by the dotted constant voltage lines, the torque load was reduced slightly, just sufficient to allow the motor to pull into synchronism. Thus, as shown in Fig. 5, proceeding at constant torque from sub-synchronous speed to pull-in, involves shifting from a lower applied voltage to a higher one. It will be observed from these curves that, while the rotor "soft" drawn at 1000° F., curve $B_3$, is slightly superior to the variable-coercivity rotor, curve $B_1$, as regards the pull-in torque for a given power input, the variable-coercivity rotor is very superior to the "hard" drawn rotor, curve $B_2$, in this respect.

As shown by the curves $A_1$ and $B_1$, one of the unusual properties of the variable-coercivity rotor is the substantial reduction in power and current that occurs in the transition from speeds just below synchronous speed to synchronism while, as shown by curves $A_2$, $B_2$ and $A_3$, $B_3$, substantially no reduction in power is realized with respect to the other rotors. With the variable-coercivity rotor, the reduction in power input amounted to 42.5% for an output torque of 0.2 oz.-in. This reduction in power is thought to be due to the fact that the motor locks into synchronism with the high-coercivity zones of the rotor effectively in the magnetic circuit of the stator, giving the rotor the characteristic of an over-excited rotor as described in applicant's prior Patent 2,328,743. This data demonstrates the valuable characteristic of reduced power input in synchronization with the variable-coercivity rotor with virtually no sacrifice of power input at sub-synchronous speeds.

Figure 6:
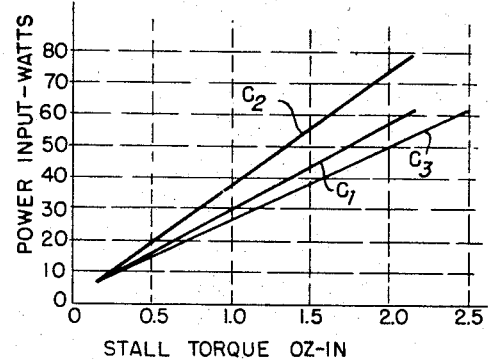

Referring to Fig. 6, the curves $C_1$, $C_2$, and $C_3$ represent the stall torque characteristics of the three rotors with respect to variable power input. These curves show that the stall torque developed by the variable-coercivity rotor, curve $C_1$, is slightly less than that developed by the rotor "soft" drawn at 1000° F., curve $C_3$, although the difference is very slight at low torque levels. However, over the entire torque range the stall torque developed by the variable-coercivity rotor is markedly superior to that of the "hard" rotor, particularly at low torque levels.

Figure 7:
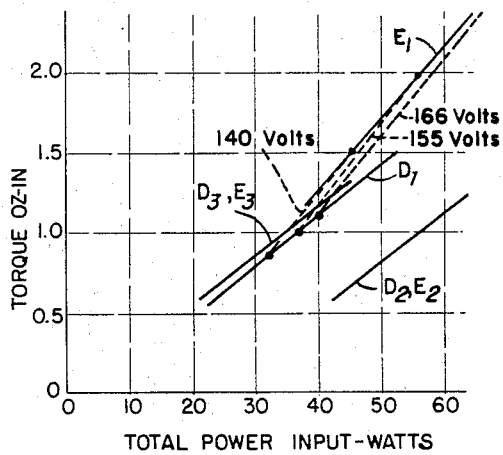

Curves $D_1$, $D_2$, and $D_3$ of Fig. 7 represent the pull-in torque characteristics of the three motors, while the curves $E_1$, $E_2$, and $E_3$ represent the pull-out torque characteristics of the motors. Curves $D_1$, $D_2$, and $D_3$ are actually the same as curves $B_1$, $B_2$, and $B_3$ of Fig. 5, but with the co-ordinate axes interchanged. The data for curves $E_1$, $E_2$, and $E_3$ was taken immediately following that for the curves of Fig. 5 in the following manner: With the same constant voltage applied as in taking the pull-in characteristic, the torque load was increased very gradually until the rotor pulled out of synchronism, the applied voltage being held at its same constant value, as indicated by the dotted constant voltage lines. From these curves it is seen that the increase in pull-out torque over pull-in torque for the "soft" rotor and the "hard" rotor is substantially zero, within the accuracy of measurement. However, in the case of the variable-coercivity rotor, it is noted that the pull-out torque represented by curve $E_1$ is substantially greater than the pull-in torque represented by curve $D_1$. At an input voltage of 119 volts, the pull-out torque was approximately 123% greater than the pull-in torque and this result was achieved at no increase in required synchronizing power input over that of the "soft" rotor. This increase in pull-out torque means that there is an increased magnetic moment between the rotor and stator, correspondingly increasing the stability of the motor.

Figure 8:
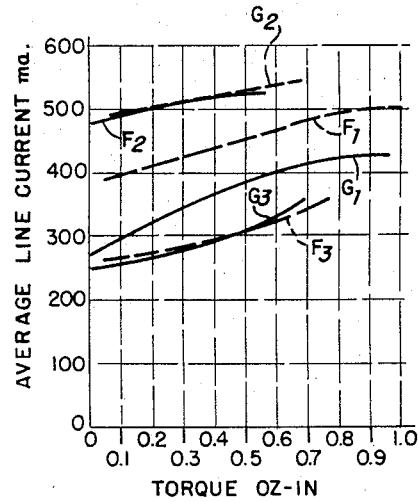

The curves $F_1$, $F_2$, and $F_3$ of Fig. 8 represent the line-current characteristics of the three motors at sub-synchronous speed, while the curves $G_1$, $G_2$, and $G_3$ represent the line-current characteristics of the three motors at synchronism. It will be observed that there is a very substantial reduction in line current drawn by the motor with the variable-coercivity rotor in the transition from a sub-synchronous state to synchronism, as represented by the difference between curves $G_1$ and $F_1$. In the case of the motors with the other two rotors, however, the reduction in line current at synchronism is very slight.

Figure 9:
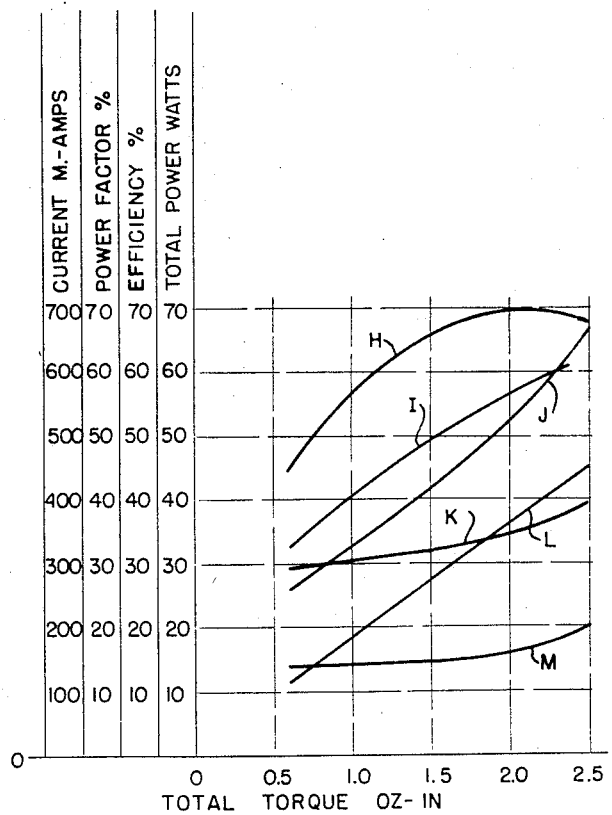

In Fig. 9 are represented the load characteristics of a motor including the variable-coercivity rotor, curve H representing efficiency; curve I representing power factor; curve J representing power input; curve K representing current input; curve L representing power output; and curve M representing total power loss, all of the characteristics being plotted with respect to output torque over the operating range of the motor. These curves show that for a miniature motor having the specifications given above, there is developed a very superior efficiency and power factor and a relatively low power loss and current input for output torques over the operating range of the motor. In the brief, for any given operating losses in the motor, the load characteristic of a motor with a variable-coercivity rotor is markedly superior to that of a uniform coercivity rotor of the "hard" or "soft" type, showing a tremendous increase in load-carrying ability and a large increase in efficiency.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a hysteresis synchronous motor, a rotor construction comprising: a cylindrical member of magnetic material of high hysteretic constant having an even number of spaced segmental first zones of a given coercivity and an equal number of segmental second zones alternating with said first zones and of a substantially greater coercivity.

2. In a hysteresis synchronous motor, a rotor construction comprising: an annular ring of magnetic material of high hysteretic constant having an even number of spaced segmental first zones of a given coercivity and an equal number of segmental second zones alternating with said first zones and of a substantially greater coercivity.

3. In a hysteresis synchronous motor, a rotor construction comprising: a cylindrical member of cobalt alloy steel containing of the order of 17% cobalt and having an even number of spaced segmental first zones of a given coercivity and an equal number of segmental second zones alternating with said first zones and of a substantially greater coercivity.

4. In a hysteresis synchronous motor, a rotor construction comprising: a cylindrical member of magnetic material of high hysteretic constant having a pair of spaced segmental first zones of a given coercivity and a pair of segmental second zones alternating with said first zones and of a substantially greater coercivity.

5. In a hysteresis synchronous motor, a rotor construction comprising: a cylindrical member of alloy steel having a high hysteretic constant and a high coercivity and having an even number of spaced segmental zones heat-treated to impart thereto a substantially lower coercivity.

6. In a hysteresis synchrous motor, a rotor construction comprising: a cylindrical member of homogeneous alloy steel having a high hysteretic constant and a high coercivity and having an even number of spaced segmental zones heat-treated to impart thereto a substantially lower coercivity.

7. In a hysteresis synchronous motor, a rotor construction comprising: a cylindrical member of alloy steel having a high hysteretic constant and a high coercivity and having an even number of spaced segmental first zones drawn at a relatively high temperature to impart thereto a substantially lower coercivity.

8. In a hysteresis synchronous motor, a rotor construction comprising: at least two pairs of complementary cylindrical segments of magnetic material of high hysteretic constant, alternate ones of said segments having a relatively low coercivity and intervening ones of said segments having a substantially greater coercivity.

9. A method of heat-treating a hysteresis motor rotor in the form of a cylindrical member of homogeneous alloy steel having a high hysteretic constant and a given coercivity which comprises locally heating an even number of spaced segmental zones to an elevated temperature and drawing the same at a temperature to impart thereto a coercivity substantially different than that of the intervening zones.

10. A method of heat-treating a hysteresis motor rotor in the form of a cylindrical member of homogeneous alloy steel having a high hysteretic constant and high coercivity which comprises locally heating an even number of spaced segmental zones to an elevated temperature and drawing the same at a relatively high temperature to impart thereto a coercivity substantially less than that of the intervening zones.

11. A method of heat-treating a hysteresis motor rotor in the form of a cylindrical member of homogeneous alloy steel having a high hysteretic constant which comprises heating said member to an elevated temperature and drawing the same at a relatively low temperature to impart thereto a relatively high coercivity; and locally heating an even number of spaced segmental zones to an elevated temperature and drawing the same at a relatively high temperature to impart thereto a coercivity substantially less than that of the intervening zones.

12. A method of heat-treating a hysteresis motor rotor in the form of an annular ring of homogeneous alloy steel having a high hysteretic constant and a given coercivity which comprises locally heating an even number of spaced segmental zones to an elevated temperature by passing a controlled electric heating current through each of said segments while cooling the remainder of said ring and drawing the same at a temperature to impart thereto a coercivity substantially different than that of the intervening zones.

No references cited.